US011187313B2

(12) United States Patent
Peet et al.

(10) Patent No.: US 11,187,313 B2
(45) Date of Patent: Nov. 30, 2021

(54) WEDGE CLUTCH DIFFERENTIAL

(71) Applicant: SCHAEFFLER TECHNOLOGIES AG & CO. KG, Herzogenaurach (DE)

(72) Inventors: Brian Peet, Akron, OH (US); Nicholas Hrusch, Wooster, OH (US)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 1008 days.

(21) Appl. No.: 15/855,131

(22) Filed: Dec. 27, 2017

(65) Prior Publication Data

US 2019/0195326 A1 Jun. 27, 2019

(51) Int. Cl.
| F16H 48/16 | (2006.01) |
| F16D 41/08 | (2006.01) |
| F16D 15/00 | (2006.01) |
| F16D 23/12 | (2006.01) |
| F16D 41/063 | (2006.01) |
| F16D 47/04 | (2006.01) |

(52) U.S. Cl.
CPC ............. *F16H 48/16* (2013.01); *F16D 15/00* (2013.01); *F16D 23/12* (2013.01); *F16D 41/063* (2013.01); *F16D 41/08* (2013.01); *F16D 47/04* (2013.01); *F16D 2023/123* (2013.01)

(58) Field of Classification Search
CPC .......... F16H 48/16; F16D 13/14; F16D 15/00; F16D 23/12; F16D 2023/123; F16D 41/063; F16D 41/08
See application file for complete search history.

(56) References Cited

U.S. PATENT DOCUMENTS

| 2,481,066 | A | * | 9/1949 | Bagge | F16D 41/105 |
| | | | | | 74/650 |
| 3,447,396 | A | * | 6/1969 | Seliger | F16H 48/19 |
| | | | | | 74/650 |
| RE38,012 | E | | 3/2003 | Ochab et al. | |
| 9,115,768 | B2 | | 8/2015 | Sturgin | |
| 9,933,023 | B2 | * | 4/2018 | Hemphill | F16D 41/064 |
| 10,626,930 | B2 | * | 4/2020 | Hrusch | F16D 13/18 |
| 10,816,044 | B2 | * | 10/2020 | Hrusch | F16D 41/082 |
| 2003/0089570 | A1 | * | 5/2003 | Ochab | F16H 48/19 |
| | | | | | 192/50 |
| 2007/0010366 | A1 | * | 1/2007 | Larin | F16D 41/064 |
| | | | | | 475/249 |
| 2015/0014113 | A1 | | 1/2015 | Ohr et al. | |
| 2015/0083539 | A1 | | 3/2015 | Lee et al. | |
| 2015/0152921 | A1 | | 6/2015 | Lee | |

(Continued)

OTHER PUBLICATIONS

Lee, Brian, "AWD Disconnect, Escaping the clutches of the dog", Schaeffler Symposium 2014, 27 pages.

*Primary Examiner* — David R Morris
(74) *Attorney, Agent, or Firm* — Rutan & Tucker LLP; Hani Z. Sayed

(57) ABSTRACT

A differential includes a driven body, an output element, and a clutch assembly radially interposed between the driven body and the output element. The clutch assembly includes a first wedge clutch configured to rotationally lock the output element to the driven body in a first direction and to overrun in a second direction, and a second wedge clutch configured to rotationally lock the output element to the driven body in the second direction and to overrun in the first direction.

18 Claims, 4 Drawing Sheets

(56) References Cited

U.S. PATENT DOCUMENTS

| | | | |
|---|---|---|---|
| 2015/0323018 A1* | 11/2015 | Hemphill | F16D 13/14 |
| | | | 192/40 |
| 2016/0032988 A1* | 2/2016 | He | F16D 41/063 |
| | | | 192/45.1 |
| 2016/0084326 A1 | 3/2016 | Ramsey | |
| 2019/0277351 A1* | 9/2019 | Hrusch | F16D 27/102 |
| 2020/0072300 A1* | 3/2020 | Hrusch | F16D 41/063 |

* cited by examiner

WEDGE CLUTCH DIFFERENTIAL

TECHNICAL FIELD

The present disclosure relates to differentials and more specifically to differentials that include wedge clutches.

BACKGROUND

Motor vehicles typically include a differential on the drive axle to transmit torque produced by an engine to driven wheels of the vehicle. The differential allows the driven wheels to rotate at different speeds relative to each other. This allows the outer wheel to rotate faster than the inner wheel when the vehicle is turning.

A typical differential includes a ring gear meshing with a pinion gear that is fixed to a driveshaft. A differential carrier is fixed to the ring gear and is supported for rotation within a housing of the differential. The carrier supports a pair of side gears and a pair of spider gears in meshing engagement with the side gears. The side gears are driveably connected to the driven wheels. The spider gears transmit torque from the carrier to the side gears to propel the vehicle.

SUMMARY

According to one embodiment, a differential includes a driven body, an output element, and a clutch assembly radially interposed between the driven body and the output element. The clutch assembly includes a first wedge clutch configured to rotationally lock the output element to the driven body in a first direction and to overrun in a second direction, and a second wedge clutch configured to rotationally lock the output element to the driven body in the second direction and to overrun in the first direction.

According to another embodiment, a differential includes a driven body, a first output shaft configured to couple with a half shaft, and a first forward wedge clutch configured to, when engaged, rotationally lock the first output shaft to the driven body in a reverse direction of the first output shaft and to permit rotation between the first output shaft and the driven body in a forward direction of the first output shaft. The differential further includes a first reverse wedge clutch configured to, when engaged, rotationally lock the first output shaft to the driven body in the forward direction of the first output shaft and to permit rotation between the first output shaft and the driven body in the reverse direction of the first output shaft. A second output shaft, associated with the differential, is configured to couple with another half shaft. A second forward wedge clutch of the differential is configured to, when engaged, rotationally lock the second output shaft to the driven body in the reverse direction of the second output shaft and to permit rotation between the second output shaft and the driven body in the forward direction of the second output shaft. A second reverse wedge clutch of the differential is configured to, when engaged, rotationally lock the second output shaft to the driven body in the forward direction of the second output shaft and to permit rotation between the second output shaft and the driven body in the reverse direction of the second output shaft.

According to yet another embodiment, a differential includes a driven body having an inner surface defining an opening, an output shaft disposed in the opening, and a clutch assembly radially disposed between the inner surface and the output shaft and selectively coupling the output shaft to the driven body. The clutch assembly includes a forward clutch configured to overrun in a forward direction, and a reverse clutch configured to overrun in a reverse direction.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
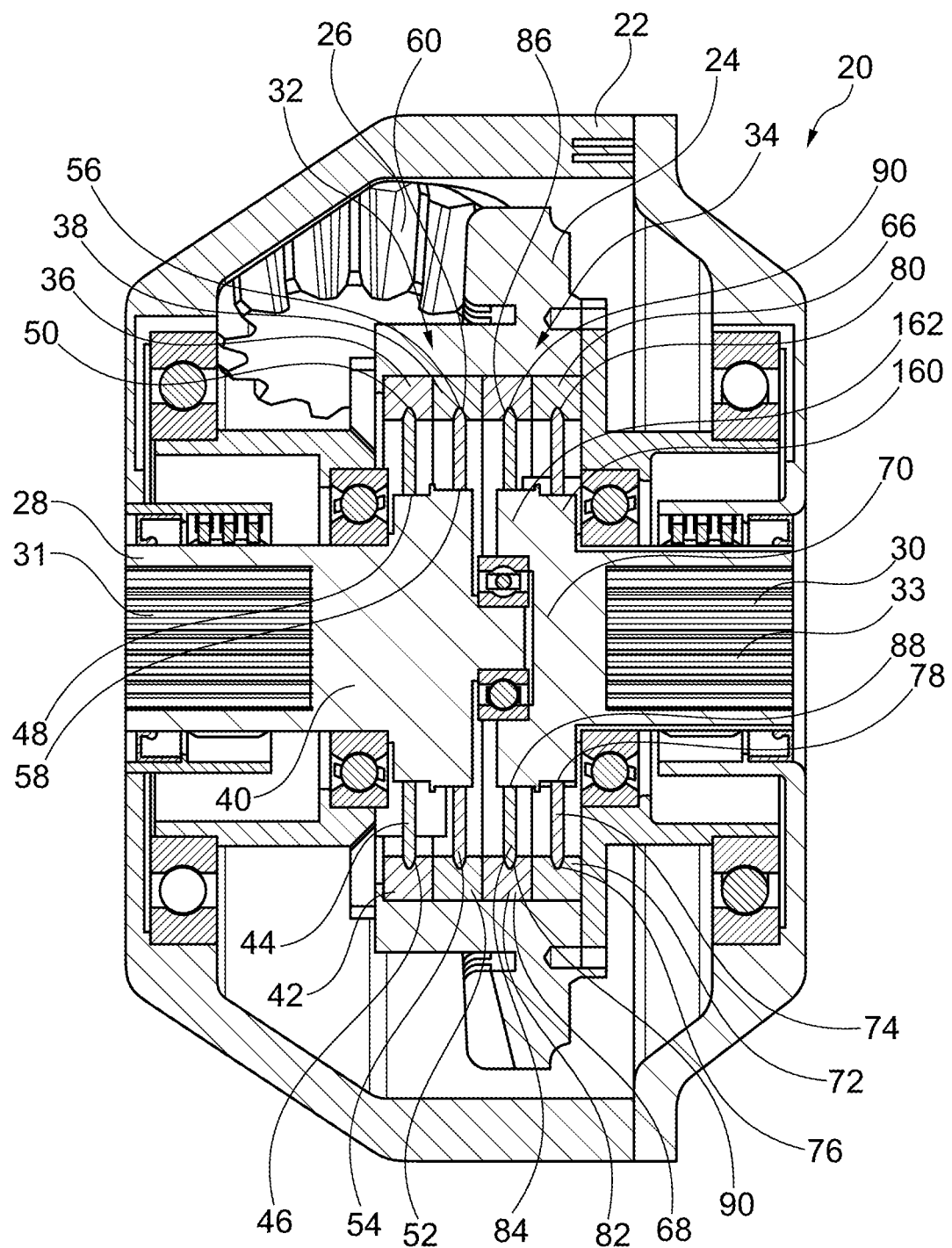
FIG. 1 is a cross-sectional view of a differential from a perspective that is perpendicular to an axial direction of the differential.

Referring to FIG. 1, a differential assembly 20 may be used to transmit an input torque generated by a powerplant, e.g. an engine or electric motor, to a pair of driven wheels. The differential assembly 20 may be used as part of a front-axle assembly, a rear-axle assembly, or both. The differential assembly 20 includes a case 22 that supports a driven body, such as the illustrated ring gear 24, for rotation therein. In other embodiments, the driven body may be chain-driven sprocket, a belt-driven pully, a carrier, or the like. The ring gear 24 may be in meshing engagement with a pinion 26 that is operably coupled with a driveshaft driven by the powerplant. The ring gear 24 has an inner surface (inner diameter) that defines a central bore through the gear 24.

The differential assembly 20 also includes a first output shaft 28 configured to connect with a first half shaft, and a second output shaft 30 configured to connect with a second half shaft. The first output shaft 28 may include a flange 31 that defines internal splines configured to engage with external splines of the first half shaft. The second output shaft 30 may include a flange 33 that defines internal splines configured to engage with external splines of the second half shaft. A portion of each of the outputs shafts 28, 30 are disposed in the central opening of the ring gear 24. The shafts 28, 30 may include features that interconnect the proximal ends to each other while allowing independent rotation of the shafts such as the illustrated projection-and-bearing arrangement.

The output shafts 28, 30 are operably coupled to the ring gear 24 by first and second clutch assemblies 32, 34, respectively. Each of the clutch assemblies 32, 34 may include a pair of one-way clutches designed to overrun (freewheel) in opposite directions. The clutches are controllable between an engaged state in which rotation is restricted in one direction and permitted in the other, and a disengaged state is which rotation in both directions is permitted. The clutches can be selectively engaged, in combinations, to rotationally fix the output shafts to the ring gear 24 in both directions, in one direction, or not at all. When the clutches are appropriately engaged, the first and second output shafts 28, 30 are permitted to rotate at different speeds relative to each other to facilitate cornering of the vehicle.

The first clutch assembly 32 may include a forward wedge clutch 36 and a reverse wedge clutch 38. When the forward wedge clutch 36 is engaged, power may be transferred from the ring gear 24 to the output shaft 28 to propel the vehicle forward. The forward clutch 36 allows the output shaft 28 to overrun in the forward direction allowing the wheel associated with the output shaft 28 to rotate faster than the ring gear 24 during a turn. Similarly, when the reverse wedge clutch 38 is engaged, power may be transferred from the ring gear 24 to the output shaft 28 to propel the vehicle backwards. The reverse wedge clutch 38 allows the output shaft 28 to overrun in the reverse direction allowing the wheel associated with the output shaft 28 to rotate faster than the ring gear 24 during a turn. (The forward direction refers to rotation that would propel the vehicle forward, and the reverse direction refers to rotation that would propel the vehicle backwards.)

More specifically, the forward clutch 36 is configured to permit the output shaft 28 to overrun in a forward direction and lock the output shaft 28 in a reverse direction of the output shaft, and the reverse wedge clutch 38 is configured to permit the output shaft 28 to overrun in the reverse direction and lock the output shaft 28 in the forward direction of the output shaft. The wedge clutches 36, 38 are radially disposed between an inside surface of the ring gear 24 and a hub 40 of the output shaft 28.

The forward wedge clutch 36 may include an annular carrier 42 that is rotationally fixed to the ring gear 24. The carrier 42 may be integrally formed with the ring gear 24 or may be a separate, ring element that is seated on the inside surface of the ring gear 24. The ring gear 24 may define a slot that engages with a key formed on the carrier 42. The forward wedge clutch 36 may also include a wedge element, such as wedge disk 44, that is radially disposed between the hub 40 and the carrier 42. The wedge disk 44 may include an inner edge 48 seated on the hub 40 and an outer edge 50 disposed within an annular groove 46 defined by the carrier 42. The wedge disk 44 is formed of a resilient material, such as steel, that allows the wedge disk 44 to radially expand and contract. The wedge disk 44 may be a single disk or multiple disks stacked together. The ring gear 24, the output shaft 28, the carrier 42, and the wedge disk 44 may be concentrically supported within the case 22. The forward wedge clutch 36 is engaged (also known as locked or closed) by radially expanding the wedge disk 44 to rotationally lock the carrier 42 and the hub 40. This will be described in more detail below.

The reverse wedge clutch 38 may include an annular carrier 52 that is rotationally fixed to the ring gear 24. The carrier 52 may be integrally formed with the ring gear 24 or may be a separate, ring element seated on the inside surface of the ring gear 24. The carrier 52 may define a key that engages with the slot formed on the ring gear 24. The reverse wedge clutch 38 may also include a wedge element, such as wedge disk 54, that is radially disposed between the hub 40 and the carrier 52. The wedge disk 54 may include an inner edge 58 seated on the hub 40 and an outer edge 60 disposed within an annular groove defined by the carrier 52. The ring gear 24, the output shaft 28, the carrier 52, and the wedge disk 54 may be concentrically supported within the case 22. The wedge disk 54 may have properties that are the same as the wedge disk 44 and may operate in the same manner.

The second clutch assembly 34 may include a forward wedge clutch 66 and a reverse wedge clutch 68. When the forward wedge clutch 66 is engaged, power may be transferred from the ring gear 24 to the output shaft 30 to propel the vehicle forward. The forward clutch 66 allows the output shaft 30 to overrun in the forward direction allowing the wheel associated with the output shaft 30 to rotate faster than the ring gear 24 during a turn. Similarly, when the reverse wedge clutch 68 is engaged, power may be transferred from the ring gear 24 to the output shaft 30 to propel the vehicle backwards. The reverse wedge clutch 68 allows the output shaft 30 to overrun in the reverse direction allowing the wheel associated with the output shaft 30 to rotate faster than the ring gear 24 during a turn.

More specifically, the forward wedge clutch 66 configured to permit the output shaft 30 to overrun in the forward direction and lock the output shaft 30 in the reverse direction, and a reverse wedge clutch 68 configured to permit the output shaft 30 to overrun in the reverse direction and lock the output shaft 30 in the forward direction. The wedge clutches 66, 68 are radially disposed between the inside surface of the ring gear 24 and a hub 70 of the output shaft 30. The wedge clutches 66 and 68 may be adjacent to wedge clutches 36 and 38 forming a stack of clutches disposed in the hub of the ring gear 24.

The forward wedge clutch 66 may include an annular carrier 72 that is rotationally fixed to the ring gear 24. The carrier 72 may be integrally formed with the ring gear 24 or may be a separate, ring element that is seated on the inside surface of the ring gear 24. The carrier 72 may define a key that engages with the slot formed the ring gear 24. The forward wedge clutch 66 may also include a wedge element, such as wedge disk 74, that is radially disposed between the hub 70 and the carrier 72. The wedge disk 74 may include an inner edge 78 seated on the hub 70 and an outer edge 80 disposed within an annular groove 76 defined by the carrier 72.

The reverse wedge clutch 68 may include an annular carrier 82 that is rotationally fixed to the ring gear 24. The carrier 52 may be integrally formed with the ring gear 24 or may be a separate, ring element that is seated on the inside surface of the ring gear 24. The carrier 82 may define a key that engages with the slot of the ring gear 24. The reverse wedge clutch 68 may also include a wedge element, such as wedge disk 84, that is radially disposed between the hub 70 and the carrier 82. The wedge disk 84 may include an inner edge 88 seated on the hub 70 and an outer edge 90 that is disposed within an annular groove 86 defined by the carrier 82. The ring gear 24, the output shaft 30, the carriers 72 and 82, and the wedge disks 74 and 84 may be concentrically supported within the case 22. The wedge disks 74, 84 may have properties that are the same as the wedge disk 44 and may operate in the same manner.

Figure 2:
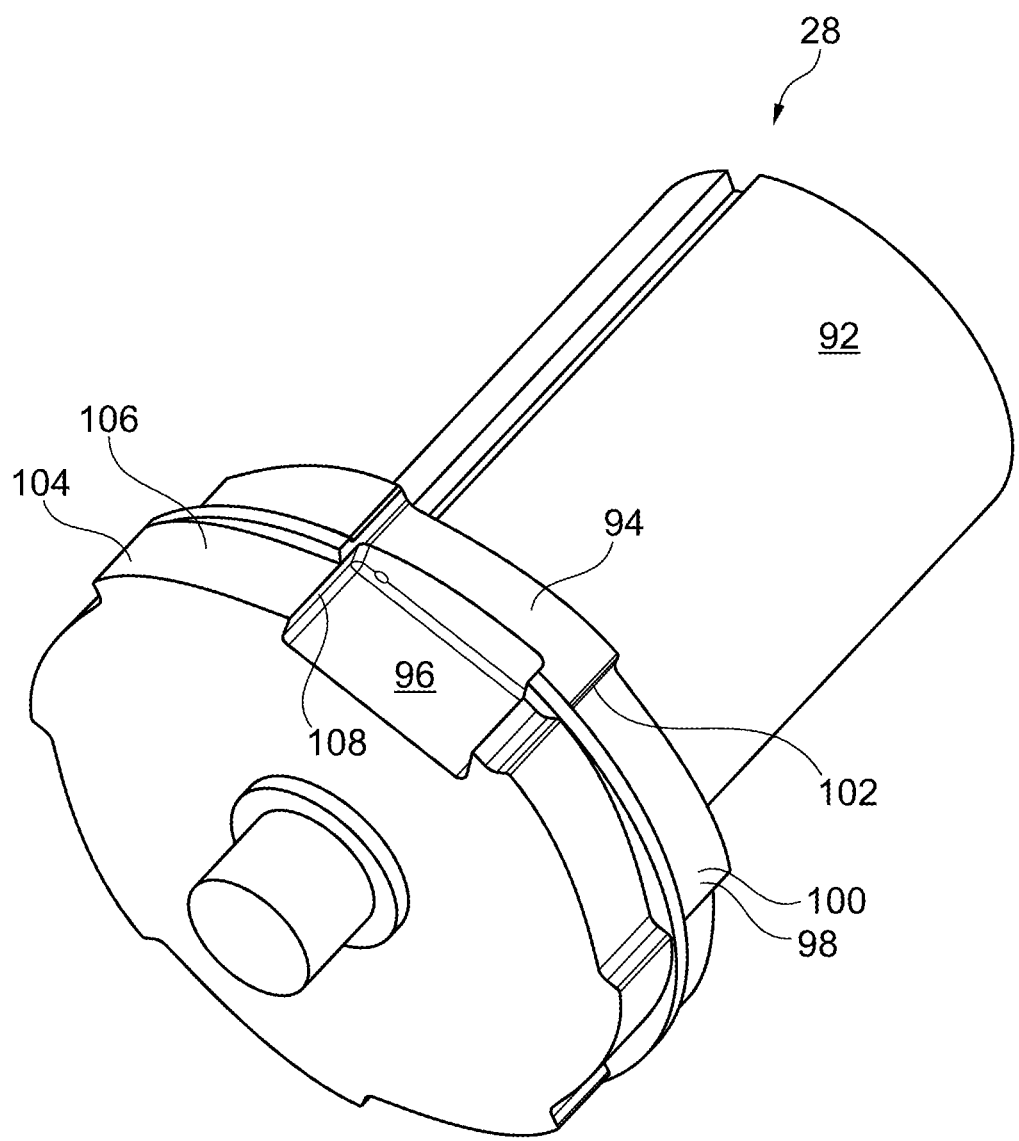
FIG. 2 is a perspective view of an output shaft of the differential.

Referring to FIG. 2, the hub 40 of the first output shaft 28 defines a forward cam 94 that is associated with the forward wedge clutch 36, and a reverse cam 96 that is associated with the reverse wedge clutch 38. The forward cam 94 defines a plurality of radially extending ramps 98 that are circumferentially arranged around the cam 94. Each ramp 98 may include a sloped surface 100 and a radial face 102. The ramps 98 are configured such that the sloped surfaces 100 slope radially outward in the forward direction, which is clockwise in FIG. 2. The reverse cam 96 also defines a plurality of radially extending ramps 104 that are circumferentially arranged around the cam 96. Each ramp 104 may include a sloped surface 106 and a radial face 108. The ramps 104 are configured such that the sloped surfaces 106 slope radially outward in the reverse direction, which is counterclockwise in FIG. 2. The ramps 98 and 104 may be similar to each other although sloped in opposite directions. The ramps 98, 104 may be arranged on their respective cams so that the radial faces 102 are aligned with the radial faces 108. The wedge disks 44 and 54 includes features that cooperate with the ramps 98, 104, respectively, to radially expand the disks.

Figure 3:
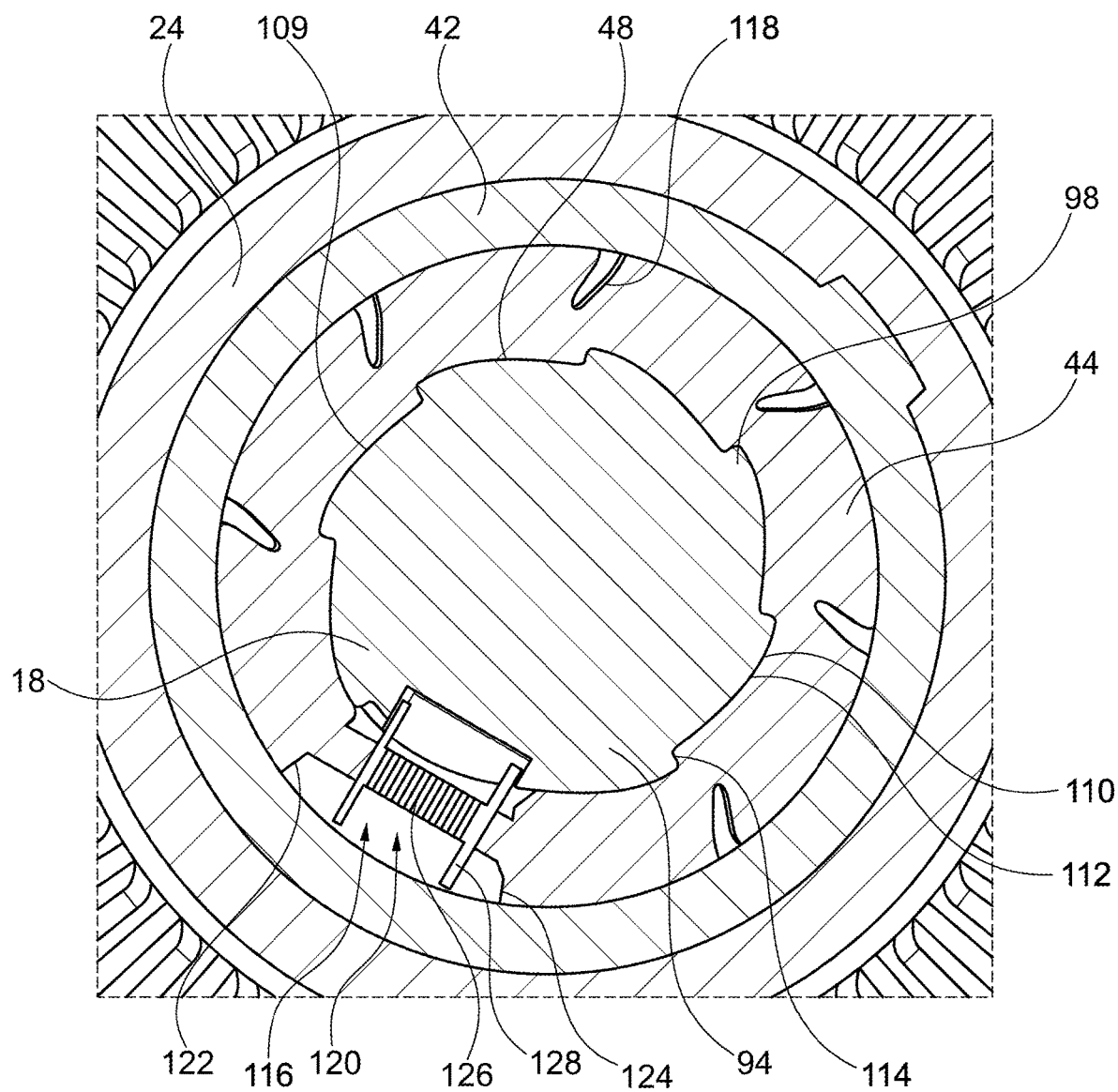
FIG. 3 is a cross-sectional view of the differential showing a forward clutch.

Referring to FIG. 3, the wedge clutch 36 operates by radially expanding the wedge disk 44 to lock the output shaft 28 to the ring gear 24 in the reverse direction of the output shaft 28 when the wedge clutch 36 is engaged, and by radially contracting the wedge disk 44 to permit independent rotation between the output shaft 28 and the ring gear 24 when the clutch 36 is disengaged. The wedge disk 44 may have a cammed surface 109 formed on the inner edge 48. The cammed surface 109 is configured to nest with the forward cam 94 when the wedge disk 44 is radially contracted on the cam 94, i.e., the contracted position. The cammed surface 109 may include lobes 110 having a sloped surface 112 and a radial wall 114. The sloped surfaces 112 slope radially outward in the forward direction, which is counterclockwise in FIG. 3.

The cammed surface 109 and the cam 94 have substantially matching shapes so that the ramps 98 are received in the lobes 110 when the cam 94 and the wedge disk 44 are in a first rotational position relative to each other. In the first rotational position, which corresponds to a disengaged state of the clutch 36, the wedge disk 44 is the contracted position. When the wedge disk 44 and the cam 94 rotate relative to each other, the cam 94 and the cammed surface 109 become misaligned, i.e., the ramps 98 slide on the lobes 110, causing radial expansion of the wedge disk 44. Radial expansion of the wedge disk 44 increases frictional engage between the outer edge 50 and the groove 46 of the carrier 42. The wedge disk 44 may include a split end 116 and slots 118 to facilitate radial expansion.

The wedge disk 44 may be partially expanded when in the resting position to place the outer edge 50 in contact with the groove 46. The wedge disk 44 may be radially expanded to engage the clutch 36 and radially contracted to disengage the clutch. Locking of the clutch 36 may be initiated by rotating the ring gear 24 in the forward direction (counterclockwise in FIG. 3) when the wedge disk 44 is in the resting position to create a small torque capacity. (Rotation of the ring gear will not lock the clutch 36 when the disk 44 is in the contracted position.) The small torque capacity is sufficient to rotate the wedge disk 44 relative to the cam 94, which receives a reaction torque from the ground, causing the lobes 110 and the ramps 98 to become misaligned. The torque capacity between the wedge disk 44 and the carrier 42 continues to increase as the lobes 110 and the ramps 98 become more and more misaligned, which eventually frictionally locks the wedge disk 44 to the carrier 42 allowing meaningful power transfer through the clutch 36. The ramps 98 and the lobes 110 cooperate to lock the wedge disk 44 to the cam 94. The clutch 36 is considered fully engaged or locked when the carrier 42 and the cam 94 rotate in unison.

When the forward wedge clutch 36 is engaged, the output shaft 28 is prevented from rotating in the reverse direction. This allows power from the ring gear 24 to be transferred to the output shaft 28 via the wedge clutch 36 so that the associated driven wheel is rotated in the forward direction to propel the vehicle forward.

The forward clutch 36 allows the output shaft 28 to overrun in the forward direction. This may occur when the wheel associated with the output shaft 28 is the outer wheel during a turn. Acceleration of the output shaft 28 relative to the ring gear 24 causes the carrier 42 to unload, which allows the ramps 98 and the lobes 110 to realigned and the disk 44 to radially contract to its resting position. The small torque capacity that occurs between the wedge disk 44 and the carrier 42 when in the resting position is insufficient to interfere with proper rotation of the outer wheel during a turn.

The forward wedge clutch 36 may be disengaged by contracting the wedge disk 44 with an actuator 120. The actuator 120 may be disposed within the split end 116 and is configured to pull a first end 122 towards a second end 124 to move the wedge disk 44 to the contracted position. Moving the disk 44 to the contracted position disengages the outer edge 50 and the groove 46 allowing the carrier 42 and the wedge disk 44 to rotate independently of each other thus disengaging the clutch 36. The actuator 120 may be an electric actuator that includes an electric coil 126 wound around a bobbin 128. Energization of the electric coil 126 attracts the first and second ends 122, 124 towards each other to disengage the clutch 36. Other types of actuators are known and may be used to contract the wedge disk 44.

Figure 4:
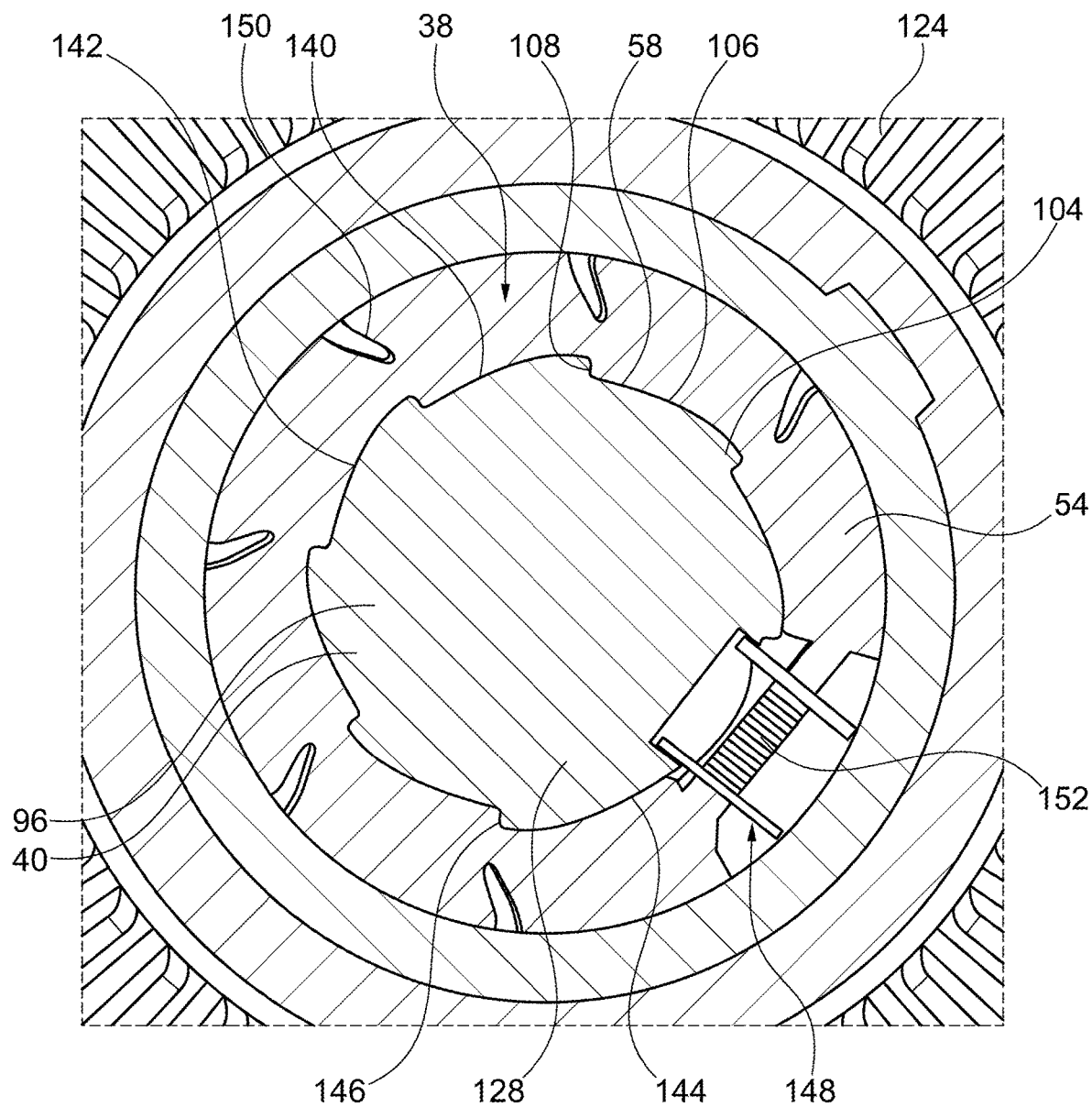
FIG. 4 is a cross-sectional view of the differential showing a reverse clutch.

Referring to FIG. 4, the wedge clutch 38 operates by radially expanding the wedge disk 54 to lock the output shaft 28 to the ring gear 24 in the forward direction of the output shaft 28 when the wedge clutch 38 is engaged, and by radially contracting the wedge disk 54 to permit independent rotation between the output shaft 28 and the ring gear 24 when the clutch 38 is disengaged. The wedge disk 54 may have a cammed surface 140 formed on the inner edge 58. The cammed surface 140 is configured to nest with the reverse cam 96 when the wedge disk 54 is in the contracted position. The cammed surface 140 may include lobes 142 having a sloped surface 144 and a radial wall 146. The sloped surfaces 112 slope radially outward in the reverse direction, which is clockwise in FIG. 4.

The cammed surface 140 and the cam 96 have substantially matching shapes so that the ramps 104 are received in the lobes 142 when the cam 96 and the wedge disk 54 are in a first rotational position relative to each other. In the first rotational position, which corresponds to a disengaged state of the clutch 38, the wedge disk 54 is the contracted position. When the wedge disk 54 and the cam 96 rotate relative to each other, the cam 96 and the cammed surface 140 become misaligned, i.e., the ramps 104 slide on the lobes 142, causing radial expansion of the wedge disk 54. Radial expansion of the wedge disk 54 increases frictional engage between the outer edge 60 and the groove 56 of the carrier 52. The wedge element 54 may include a split end 148 and slots 150 to facilitate radial expansion.

The wedge disk 54 may be partially expanded when in the resting position to place the outer edge 60 in contact with the groove 56. The wedge disk 54 may be radially expanded to engage the clutch 38 and radially contracted to disengage the clutch. Locking of the reverse clutch 38 may be initiated by rotating the ring gear 24 in the reverse direction (clockwise in FIG. 4) when the wedge disk 54 is in the resting position to create a small torque capacity. (Rotation of the ring gear 24 will not lock the clutch 38 when the disk 54 is in the contracted position.) The small torque capacity is sufficient to rotate the wedge disk 54 relative to the cam 96, which receives a reaction torque from the ground, causing the lobes 142 and the ramps 104 to become misaligned. The torque capacity between the wedge disk 54 and the carrier 52 continues to increase as the lobes 142 and the ramps 104 become more and more misaligned, which eventually locks the wedge disk 54 to the carrier 52 allowing meaningful power to flow through the clutch 38. The ramps 104 and the lobes 142 cooperate to lock the wedge disk 54 to the cam 96. The clutch 38 is considered fully engaged or locked when the carrier 52 and the cam 96 rotate in unison.

When the reverse wedge clutch 38 is engaged, the output shaft 28 is prevented from rotating in the forward direction. This allows power from the ring gear 24 to be transferred to the output shaft 28 via the wedge clutch 38 so that the associated driven wheel is rotated in the reverse direction to propel the vehicle backwards.

The reverse clutch 38 is configured to overrun in the reverse direction of the output shaft 28. This may occur when the wheel associated with the output shaft 28 is the outer wheel during a turn. Acceleration of the output shaft 28 relative to the ring gear 24 causes the ramps 104 and the lobes 142 to become realigned allowing the disk 54 to radially contract to its resting position. The small torque capacity that occurs between the wedge disk 54 and the carrier 52 when in the resting position is insufficient to interfere with proper rotation of the outer wheel during a turn. The reverse wedge clutch 38 may be disengaged by contracting the wedge disk 54 with an actuator 152. The actuator 152 may be the same or similar to the actuator 120.

Referring back to FIG. 1, the second output shaft 30 and the clutch assembly 34 may be the same or similar to the above described arrangement of the first output shaft 28 and the first clutch assembly 32. Briefly, the hub 70 of the second output shaft 30 may include a forward cam 160 that has ramps extending in the forward direction, and a reverse cam 162 that has ramps extending in the reverse direction. The inner edge 78 of the wedge disk 74 may define a cammed surface having lobes that cooperate with the ramps to radially expand the wedge disk 74 to lock the forward clutch 66. The inner edge 88 of the wedge disk 84 may define a cammed surface having lobes that cooperate with the ramps of the reverse cam 162 to radially expand the wedge disk 84 to lock the reverse clutch 68. The forward wedge clutch 66 and the reverse wedge clutch 68 may each have an associated actuator configured to move the wedge disk to the contracted position to disengage the clutch. The actuator may be the same or similar to actuator 120.

The number of clutches used in each of the clutch assemblies 32, 34 can be scaled up or down to increase or decrease the power and torque capacities of the differential 20. The ratio of forward clutches to reverse clutches may be 1:1 (as shown) or the clutch assemblies may include more forward clutches than reverse clutches, or vice versa.

The differential 20 may include a plurality of operating modes that are achieved by engaging and disengaging select ones of the clutches 36, 38, 66, and 68. The differential 20 may be in electronic communication with a vehicle controller that engages and disengages the clutches. The wedge clutches may be biased to be engaged, i.e., the clutches are engaged when the actuator is deactivated, and are disengaged by activating the actuator. Thus, the controller may disengage a clutch by energizing the coil associated with that clutch, e.g., clutch 36 is disengaged by energizing coil 126. In other embodiments, the clutches may be biased to a disengaged state and are engaged by activating an actuator.

The differential 20 may include a fully locked mode in which the first output shaft 28 and the second output shaft 30 are rotationally fixed to the ring gear 24 in both the forward and reverse directions. Fully locked mode is accomplished by engaging all of the clutches. In the illustrated embodiment, this means de-energizing all of the actuators. When both clutches of the clutch assembly 32 are engaged, the forward clutch 36 prevents the output shaft 28 from rotating in the reverse direction, and the reverse clutch 38 prevents the output shaft 28 from rotating in the forward direction to fully lock the output shaft 28 to the ring gear 24. Similarly, when both clutches of the clutch assembly 34 engaged, the forward clutch 66 prevents the output shaft 30 from rotating in the reverse direction, and the reverse clutch 68 prevents the output shaft 30 from rotating in the forward direction to fully locked the output shaft 30 to the ring gear 24. In fully locked mode, both of the driven wheels rotate in unison to provide optimum traction, but turning may be impaired due to the inner and outer wheels not being permitted to rotate relative to each other.

The differential 20 may also include a forward-drive mode in which the output shafts 28 and 30 are rotationally fixed to the ring gear 24 in the reverse direction to prevent the shafts from rotating slower than the ring gear 24, but are allowed to overrun in the forward direction to permit the outer wheel to rotate faster during cornering, which increases maneuverability of the vehicle. During turning, the inner wheel remains fixed to the ring gear 24, which is different than a standard differential in which the inner wheel spin slower than the ring gear 24. In the illustrated embodiment, this mode is entered by energizing the coils to disengage the reverse clutches 38, 68, and allowing the forward clutches 36 and 66 to remain engaged.

The differential 20 may further include a reverse-drive mode in which the output shafts 28 and 30 are rotationally fixed to the ring gear 24 in the forward direction to prevent the shafts from rotating slower than the ring gear 24, but are allowed to overrun in the reverse direction to permit the outer wheel to rotate faster during turning of the vehicle, which increases maneuverability. In the illustrated embodiment, this mode is entered by energizing the coils to disengage the forward clutches 36, 66, and allowing the reverse clutches 38 and 68 to remain engaged.

The differential 20 may also include a fully open mode in which all of the clutches are disengaged. In this mode, both of the output shafts 28 and 30 are completely decoupled from the ring gear 24 and power cannot be transmitted to the wheels. In the illustrated embodiment, this mode is entered by energizing all of the coils to disengage the forward clutches 36, 66 and the reverse clutches 38, 68. This mode may be useful for towing, or to disengage one of the axles of a four-wheel-drive vehicle. For example, if the differential 20 was utilized on the front axle of a four-wheel-drive vehicle, the vehicle could operate in a two-wheel-drive mode by placing the differential in the fully open mode.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A differential comprising:
   a driven body;

an output element; and
a clutch assembly radially interposed between the driven body and the output element and including a first wedge clutch configured to rotationally lock the output element to the driven body in a first direction and to overrun in a second direction, and a second wedge clutch configured to rotationally lock the output element to the driven body in the second direction and to overrun in the first direction;
wherein the first wedge clutch includes:
a first cam,
a first annular carrier, and
a first wedge element configured to engage the first cam to radially expand the first wedge element into frictional engagement with the carrier,
wherein the carrier defines an annular groove and an outer edge of the first wedge element is disposed in the groove.

2. The differential of claim 1 further comprising:
a second output element; and
a second clutch assembly interposed between the driven body and the second output element and including a third wedge clutch configured to rotationally lock the second output element to the driven body in the first direction and to overrun in the second direction, and a fourth wedge clutch configured to rotationally lock the second output element to the driven body in the second direction and to overrun in the first direction.

3. The differential of claim 1, wherein:
the first cam has ramps sloping radially outward in the second direction,
the first annular carrier is rotationally fixed to the driven body, and
the first wedge element is radially disposed between the first carrier and the first cam, wherein the first wedge element has lobes configured to engage with the ramps to radially expand the first wedge element into frictional engagement with the carrier.

4. The differential of claim 3, wherein the second wedge clutch includes:
a second cam having ramps sloping radially outward in the first direction,
a second annular carrier rotationally fixed to the driven body, and
a second wedge element radially disposed between the second carrier and the second cam, wherein the second wedge element has lobes configured to engage with the ramps of the second cam to radially expand the second wedge element into frictional engagement with the carrier.

5. The differential of claim 3, wherein the first cam is formed on the output element.

6. The differential of claim 3, wherein first clutch further includes an actuator configured to radially flex the wedge element.

7. The differential of claim 1, wherein the wedge clutch includes a wedge disk that is radially expandable to selectively lock the driven body to the output element in the first direction.

8. The differential of claim 1, wherein the output element, the clutch assembly, and the driven body are concentric.

9. The differential of claim 1, wherein the driven body is a ring gear.

10. A differential comprising:
a driven body;
a first output shaft configured to couple with a half shaft;
a first forward wedge clutch configured to, when engaged, rotationally lock the first output shaft to the driven body in a reverse direction of the first output shaft and to permit rotation between the first output shaft and the driven body in a forward direction of the first output shaft;
a first reverse wedge clutch configured to, when engaged, rotationally lock the first output shaft to the driven body in the forward direction of the first output shaft and to permit rotation between the first output shaft and the driven body in the reverse direction of the first output shaft;
a second output shaft configured to couple with another half shaft;
a second forward wedge clutch configured to, when engaged, rotationally lock the second output shaft to the driven body in the reverse direction of the second output shaft and to permit rotation between the second output shaft and the driven body in the forward direction of the second output shaft; and
a second reverse wedge clutch configured to, when engaged, rotationally lock the second output shaft to the driven body in the forward direction of the second output shaft and to permit rotation between the second output shaft and the driven body in the reverse direction of the second output shaft;
wherein the first forward wedge clutch includes a carrier rotationally fixed to the driven body and defining an annular groove, and a wedge element having an inner edge seated on the first output shaft and an outer edge disposed in the annular groove of the carrier, wherein the wedge element is configured to radially expand to frictionally engage the outer edge with the carrier.

11. The differential of claim 10, wherein the first output shaft has a hub defining a cam, and the inner edge is seated on the cam.

12. The differential of claim 11, wherein the cam defines radially extending ramps and the inner edge defines lobes that cooperate with the ramps to radially expand the wedge element in response to the driven body rotating in the forward direction relative to the first output shaft.

13. The differential of claim 12, wherein the ramps and the lobes are configured to radially contract the wedge element in response to the first output shaft rotating in the forward direction relative to the driven body.

14. The differential of claim 12, wherein each of the ramps includes a sloped surface and a radially extending wall.

15. The differential of claim 14, wherein sloped surface extends radially outward in the forward direction.

16. A differential comprising:
a driven body having an inner surface defining an opening;
an output shaft disposed in the opening; and
a clutch assembly radially disposed between the inner surface and the output shaft and selectively coupling the output shaft to the driven body, the clutch assembly including a forward clutch configured to overrun in a forward direction, and a reverse clutch configured to overrun in a reverse direction;
wherein the clutch assembly includes a wedge clutch having a cam, an annular carrier, and a wedge element configured to engage the cam to radially expand the wedge element into frictional engagement with the carrier, wherein the carrier defines an annular groove and an outer edge of the wedge element is disposed in the groove.

17. The differential of claim 16 further comprising:
a second output shaft; and
a second clutch assembly radially disposed between the inner surface and the second output shaft and selectively coupling the second output shaft to the driven body, the second clutch including a second forward clutch configured to overrun in the forward direction, and a second reverse clutch configured to overrun in the reverse direction.

18. The differential of claim 16, wherein the forward clutch and the reverse clutch are independently engageable such that both the forward and reverse clutches are engaged to fix the output shaft to the driven body when in a first mode of the differential, and such that the forward clutch is engaged and the reverse clutch is disengaged to rotational lock the output shaft to the driven body in the reverse direction and permit overrunning of the output shaft in the forward direction when in a second mode of the differential.

* * * * *